United States Patent

Rennerfelt

[11] Patent Number: 5,486,144
[45] Date of Patent: Jan. 23, 1996

[54] COUPLING ARRANGEMENT

[76] Inventor: Gustav Rennerfelt, Nilstorpsvägen 53, Lidingö, Sweden, S-181 47

[21] Appl. No.: 131,599

[22] Filed: Oct. 5, 1993

[30] Foreign Application Priority Data

Oct. 22, 1992 [SE] Sweden .................. 9203101

[51] Int. Cl.⁶ ..................... F16H 1/32
[52] U.S. Cl. ........................ 475/179
[58] Field of Search ............. 475/162, 331, 475/178, 179; 384/11, 50

[56] References Cited

U.S. PATENT DOCUMENTS

| | | |
|---|---|---|
| 1,350,011 | 8/1920 | Du Bois . |
| 3,726,158 | 4/1973 | Brown ..................... 475/178 |
| 4,429,595 | 2/1984 | Butterfield . |

FOREIGN PATENT DOCUMENTS

| | | |
|---|---|---|
| WO8805508 | 7/1988 | European Pat. Off. . |
| 482529A | 4/1992 | European Pat. Off. ........... 475/162 |
| 428399 | 8/1911 | France . |
| 157773 | 8/1969 | France . |
| 2390077 | 12/1978 | France . |
| 426748 | 3/1926 | Germany . |
| 1154680 | 9/1963 | Germany . |
| 92007673 | 3/1992 | Sweden . |
| 1079735 | 8/1967 | United Kingdom . |
| 1232355 | 5/1971 | United Kingdom ............ 475/162 |
| 8805509 | 7/1988 | WIPO . |

OTHER PUBLICATIONS

Patent Abstracts of Japan, vol. 13, No. 420 (M–872) 19 Sep. 1989 & JP-A-01 158 249 (Tsuoisu) 21 Jun. 1989 *abstract*.

Primary Examiner—Charles A. Marmor
Assistant Examiner—Sherry Estremsky
Attorney, Agent, or Firm—Young & Thompson

[57] ABSTRACT

A mechanism which translates in an eccentric gear a slow eccentric rotational movement of a gearwheel which has a high planetary rotational speed to centric rotation. The invention is characterized by a plate (22) which includes apertures in which axially extending cams (24a, b, 25a, b) are received. The cams are mounted in pairs on the gearwheel and on a disc (23) carried by the gear output shaft and are radially movable in relation to the plate (22). According to one embodiment, the plate (22) includes four apertures, in the form of radially open grooves.

1 Claim, 5 Drawing Sheets

Fig. 2
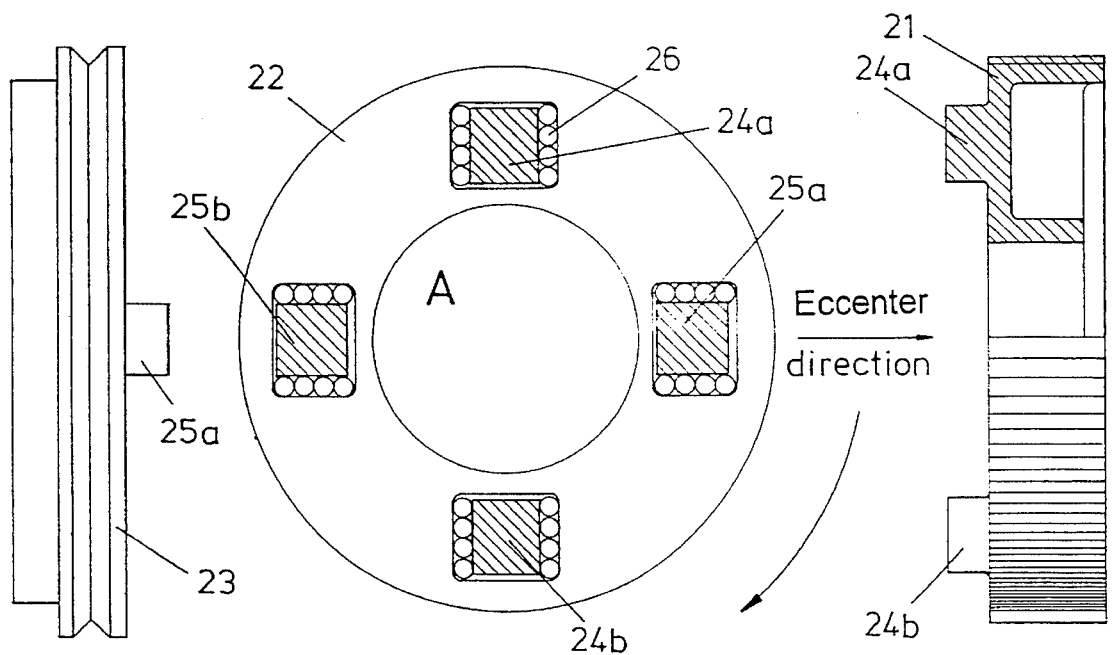
Fig. 3b
Fig. 3a
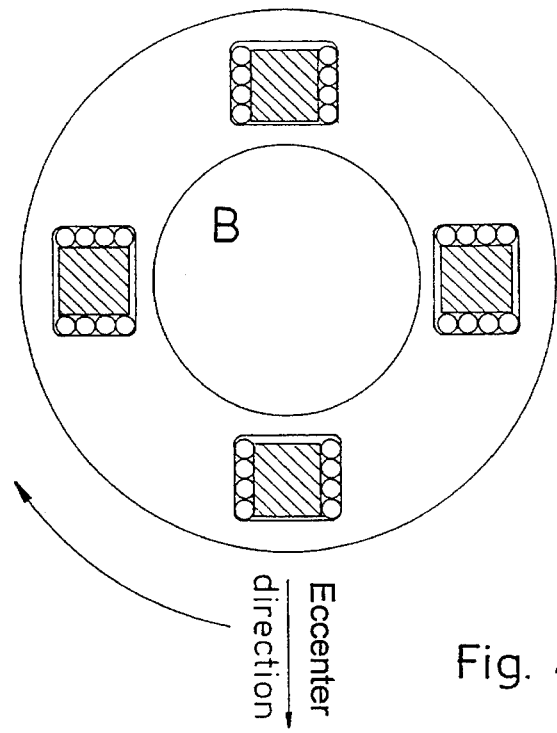
Fig. 4

COUPLING ARRANGEMENT

The present invention relates to a coupling arrangement pertaining to an eccentric gear of the kind which includes an input shaft having an eccentric part on which an eccentric gearwheel is freely journalled and rolls-off against an internal, stationary gearwheel. In this rapid planetary rotation, the eccentric gearwheel rotates relative to the internal gearwheel at a reduced speed about its centre of gravity in an opposite direction of rotation. This reduction in rotational speed is dependent on the difference in teeth number between the teeth of the eccentric gear wheel and those of the stationary gear wheel. See in other respects my prior publication WO 88/05508.

The purpose of the coupling arrangement is to translate this reduced rotational speed about the centre of gravity of the gearwheel that executes the aforesaid rapid planetary movement to solely a slow, centric rotational movement.

Reduction gears which achieve large speed reductions are used, for instance, in robot technology. In this respect, high demands are placed on rigidity and in the absence of play. The reduction ratio often lies within the range of 50:1–200:1. The reduction gears will preferably have a small volume and be maintenance free.

BACKGROUND ART

The output shaft of the previously known so-called Cyclo gear has mounted thereon a plurality of axially directed pins which roll against the surfaces of bores formed in and extending through two or three eccentrically journalled gearwheels of the gear. In order for this coupling arrangement to function, it is necessary that at least two gearwheels are phase-shifted through 180° in relation to one another. The drawback with this known coupling arrangement is that the gear components must be manufactured to high degrees of accuracy. The gear also comprises a large number of components.

Variants of the so-called Oldham coupling, as described in U.S. Pat. No. 4,429,595 for instance, is another example of a coupling arrangement for eccentric gears. All of these types of coupling arrangements are space-consuming and have a large mass, which is liable to cause undesirable vibrations.

Another coupling arrangement which functions to translate the aforesaid gearwheel rotary movement to centric rotation is described in my prior publication WO 88/05509.

Still another coupling arrangement for eccentric gears is described in my Swedish Patent Application 9200767-3.

The coupling arrangement taught by this patent specification includes a circular plate, called a gear plate which has groups of mutually parallel grooves on each side surface of the plate. The grooves in the groups on one side of the plate extend perpendicularly to the grooves in the groups on the other side of said plate. The gear plate is characterized in that it is highly rigid in relation to its weight. This low weight of the circular plate enables the radially directed, dynamic disturbances that are unavoidable in eccentric gears to be kept at an acceptably low level. The tangentially directed forces of the transmitted torque are transferred from one group of grooves to the group of grooves on the other side of the gear disc. As before mentioned, this group of grooves is displaced through 90°. In order to obtain a low surface pressure, and therewith a long useful life, the forces are distributed over all tooth-surfaces of the groups of grooves. Since the gear plate is relatively thin, the axial distance between the pressure points within respective groove groups will be small, whereby the gear plate will only be arched/distorted from a flat state to a small extent when the output shaft of the gear is subjected to a heavy load. The construction imparts a relatively high rigidity to the gear.

The gear disc according to the aforesaid Swedish patent application, however, has certain drawbacks. For instance, when the groove groups are comprised of a slide friction element, they will generate a certain power loss. Relatively high demands are placed on manufacturing tolerances, in order to obtain uniform load distribution over all teeth in the groove groups.

With the intention of reducing friction losses, it is suggested in the aforesaid Swedish Patent Application 9200767-3, that balls or rollers are disposed in the groups of grooves on both sides of the disc, said balls or rollers being intended to roll in the grooves on the disc and in the grooves on the side of the gearwheel or in the grooves on the axial surface of the output shaft. In order to obtain play-free transmission, however, it is necessary to subject the balls or rollers, to an axially acting spring bias, in order to eliminate play. This requires the provision of a thrust bearing. It is desirable to use rollers when wishing to transmit large torques. For geometrical reasons, the grooves in the disc must then have an angle of 90°, which results in a higher axial force component that must be taken-up by the thrust bearing.

Another drawback with this construction is that it is difficult to hold the balls or rollers in their correct position in the grooves.

SUMMARY OF THE INVENTION

The object of the present invention is to provide a modified coupling arrangement of the aforesaid kind, by means of which the aforesaid drawbacks, such as the tendency of the plate to arch at high torque transmissions are eliminated, and therewith decrease the transmission rigidity, the need of thrust bearings, and high tolerance requirements on the components of the coupling arrangement and the friction losses caused thereby.

This object is achieved in accordance with the invention by providing the coupling arrangement with a circular plate which includes a centre hole and which has four apertures which are located generally uniformly around the centre of the plate, two first cams which are diametrically opposed to one another on one side surface of the eccentric gearwheel and which project out axially from said side surface and which fit slidingly and radially into two of said openings, and further includes two second cams which are diametrically opposite one another on one side surface of the output shaft and project axially out from the side surface of said shaft and which fit slidingly into the remaining two openings, whereby the tangentially acting torque forces of the all act in one and the same axial plane within the plate. This prevents arching of the plate and also prevents the occurrence of axially acting force components which need to be balanced with the aid of thrust bearings and springs.

According to another embodiment of the invention, the aforesaid apertures open outwardly in a radial direction.

According to another, preferred embodiment of the invention, rollers are mounted between the contact surfaces, to substitute sliding friction with roller friction. In order to achieve play-free transmission, the diameters of the rollers are chosen so as to generate a biassing force.

When the gear is subjected to load, the aforedescribed plate will retain its flatness, but will be elastically deformed to a slightly elliptical shape. See FIG. 11. When no load acts on the plate, the mutually opposing and mutually parallel surfaces of the plate will separate elastically from one another and also form angles with one another. These deformations are extremely small, in the order of 10 micrometers, while the angular change is in the order of 0.5 arc minutes. However, the deformations are sufficiently large to influence the distribution of load between the loaded rollers and therewith have an affect on the torque transmission capacity. By selecting rollers of mutually different size at each transmission surface when assembling the gear, the plate will obtain a deformation that corresponds, for instance, a gear loading of 80% of the rated torque. When the gear is not subjected to load, the outermost roller, seen radially, will be subjected to the aforesaid biasing force and the rollers that lie inwardly of this outermost roller will be subjected to a low biasing force, or may even present a clearance to the rolling surfaces. When the gear is subjected to a low load, the tangentially acting forces will generally influence these outermost rollers in each plate aperture. As the transmitted torque increases, the plate will spring-out radially and the angle of the rolling surface will change slightly. The load will then be distributed successively more uniformly between the rollers and all of the rollers will be subjected to the same load at the rated torque.

According to another embodiment of the invention, when fine-working the plate (normally fine-grinding) to its final form, the plate is deformed to the shape that the plate will have when the gear is loaded with the rated torque. This can be achieved by mounting the plate on a hydraulic mandrel in the grinding machine. This mandrel will function to deform the central hole of the elastic plate to an elliptical shape, and the opposing rolling surfaces of the four apertures are ground parallel in pairs.

According to another preferred embodiment of the invention, the aforesaid cams have the form of axially extending pins pressed into the gearwheel and in the output shaft, on which perforated blocks are mounted with a light push fit.

The blocks have two mutually parallel, opposing sides which have been ground to a high degree of accuracy. When the gear is subjected to load and the plate is subsequently deformed, the blocks will adjust so that the load distribution is generally uniform between the loaded rollers.

BRIEF DESCRIPTION OF THE DRAWINGS

The invention will now be described in more detail with reference to various exemplifying embodiments thereof and also with reference to the accompanying drawings, in which

FIG. 2 is an axial view of the plate, showing its apertures and sections of the cams and rollers, eccentric direction to the right;

FIG. 3a is a partially section view of eccentric gearwheels with cams;

FIG. 3b is a side view of the output shaft of the eccentric gear;

FIG. 4 is an axial view of the plate with its apertures, and shows sections of the cams and rollers; eccentric direction downwards;

DESCRIPTION OF PREFERRED EMBODIMENTS

Figure 1:
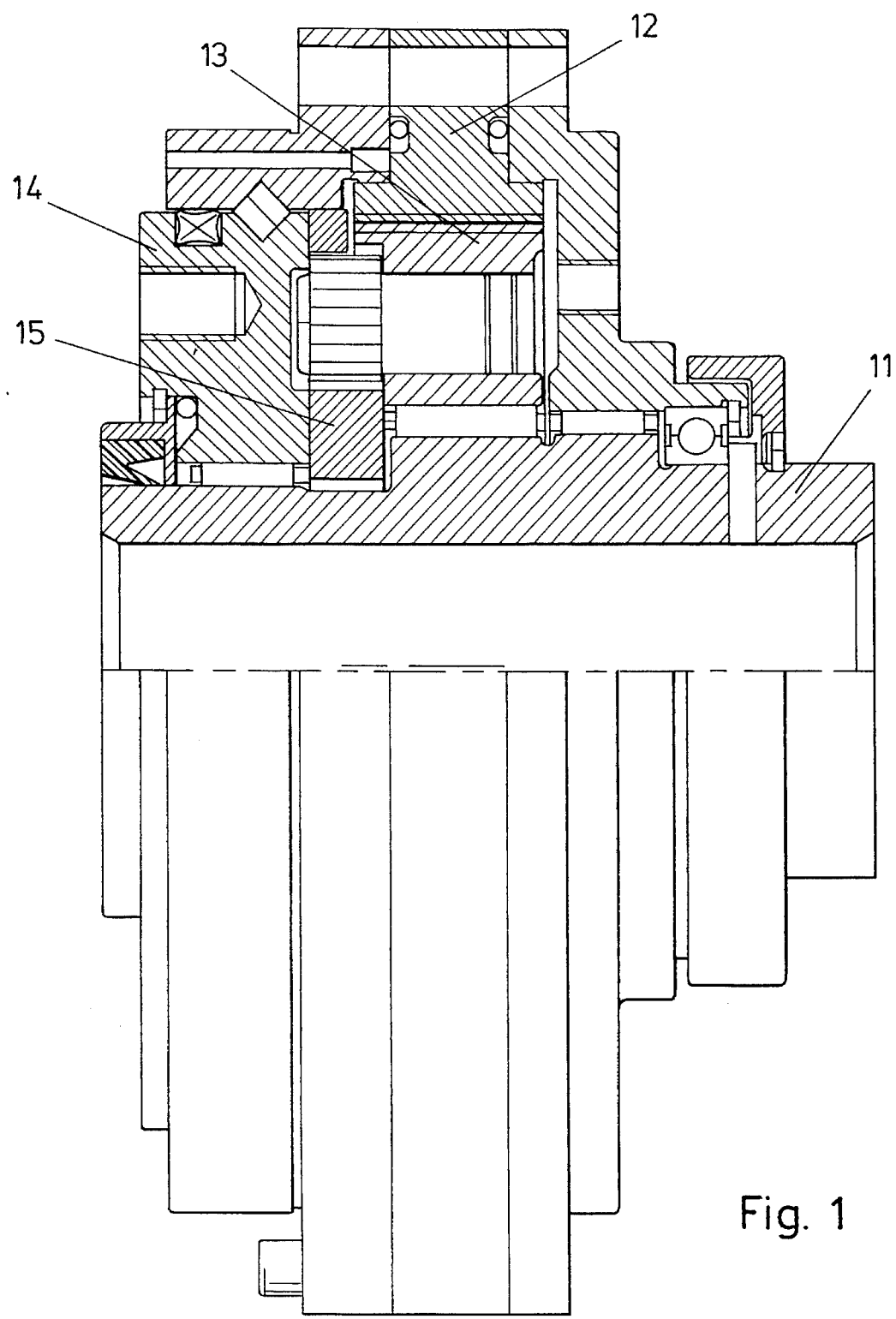
FIG. 1 is a cross-sectional view, partially in side view, of an eccentric gear which includes an inventive coupling arrangement.

FIG. 1 illustrates an eccentric gear which includes an inventive embodiment. The eccentric gear includes an input shaft 11, an internally toothed ring 12, an eccentric gearwheel 13, an output shaft 14 and a plate 15.

The eccentric gearwheel 13 is journalled eccentrically on the input shaft 11 and rolls against the internally toothed ring 12. When the difference in teeth number is small, preferably one or two less teeth on the eccentric gearwheel 13, the eccentric gearwheel 13 will rotate slowly in contra-rotation about its centre of gravity. See in other respects my prior publication WO 88/05508.

The eccentric gearwheel 13 thus executes a rapid, planetary movement about the input shaft 11 and rotates slowly about its centre of gravity. This slow planetary movement shall be translated by means of the inventive coupling arrangement to movement which is concentrical with the output shaft 14.

FIG. 2 illustrates the plate 22, which is provided with apertures or recesses in which pins 24a, 24b, mounted on the plate 22, and pins 25a and 25b mounted on a disc 23 carried by the output shaft are journalled and biassed with the aid of rollers 26. See FIGS. 3a and 3b.

FIG. 2 shows the plate in a position A, in which the eccentric direction of the eccentric gearwheel 21 is to the right and in which position the plate 22 has been entrained to the right by the pins 24a and 24b.

FIG. 4 illustrates the plate shown in FIG. 2 in a position B, in which the input shaft has rotated through 90° and the eccentricity of the gearwheel is directed downwards. During the change in the direction of eccentricity from position A to position B, the plate will have been returned to a concentric position relative to the gear axis, while the pins 24a and 24b of the eccentric gearwheel have rolled-off in the plate apertures.

Figure 5:
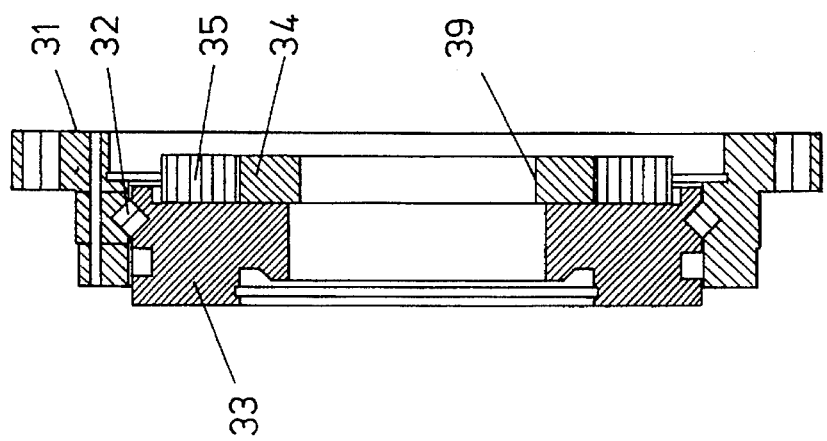
FIG. 5 is a sectional view of the output shaft and shows the shaft journal and the plate and rollers.
Figure 7:
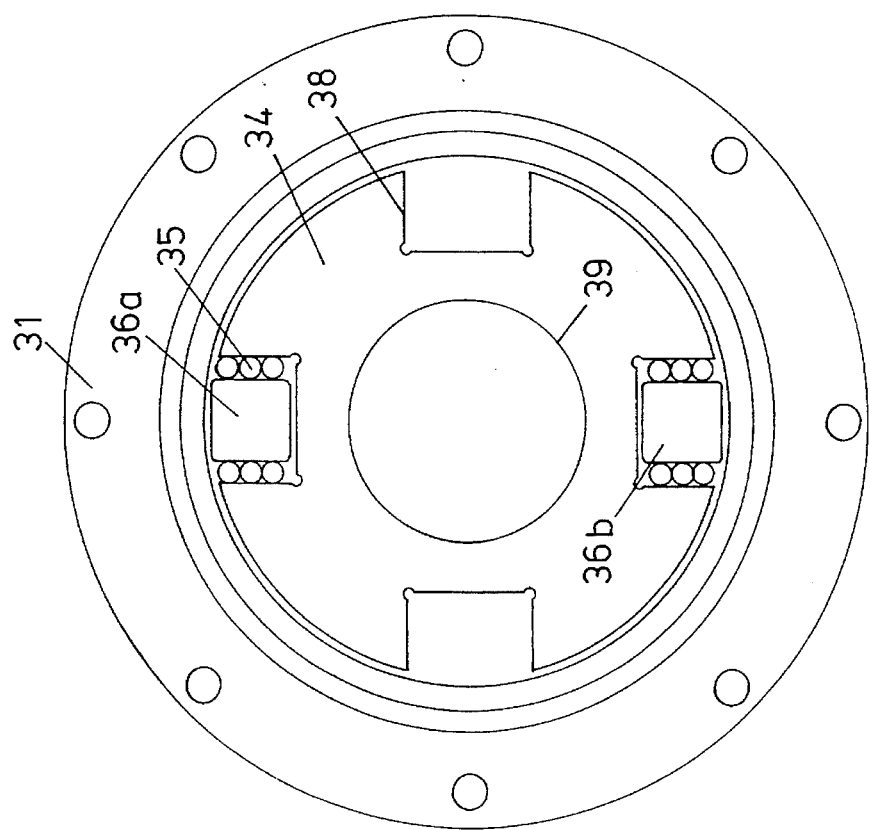
FIG. 7 is an axial view of the embodiment shown in FIG. 5, with the apertures radially open.

FIG. 5 illustrates the output shaft 33 with its integrated cross-roller journals. The rollers 32 act directly on the output shaft 33 and also on the stationary housing 31, which forms the inner and outer race of the roller bearing. This construction results in a highly rigid bearing, which contributes to the total rigidity or stiffness of the gear. Mounted on the output shaft 33 are two diametrically opposed and axially extending cams 36a, 36b (FIG. 7), which are journalled on the plate 34 and biassed by means of rollers 35 in respective apertures 38. The plate 34 is thus able to move linearly through a small distance in relation to the output shaft 33.

Figure 6:
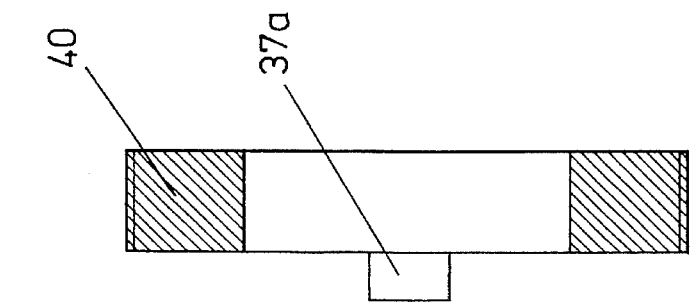
FIG. 6 is a sectional view of the eccentric gearwheel with cam.

FIG. 6 illustrates the eccentric gearwheel 40. Mounted on the gearwheel 40 are two further diametrically opposed and axially extending cams 37a, 37b, of which only cam 37a can be seen. These cams are similarly journalled in the remaining two apertures 38 (FIG. 7) and enable the eccentric gearwheel to move linearly in relation to the plate 34.

Figure 9:
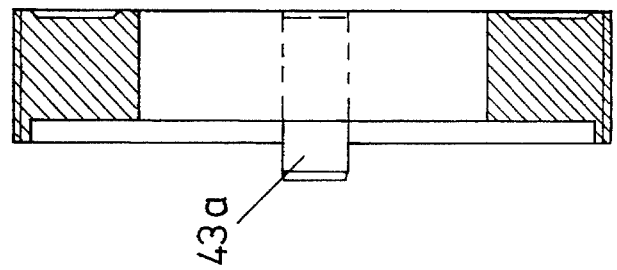
FIG. 9 is a sectional view of the eccentric gearwheel, provided with pins.
Figure 8:
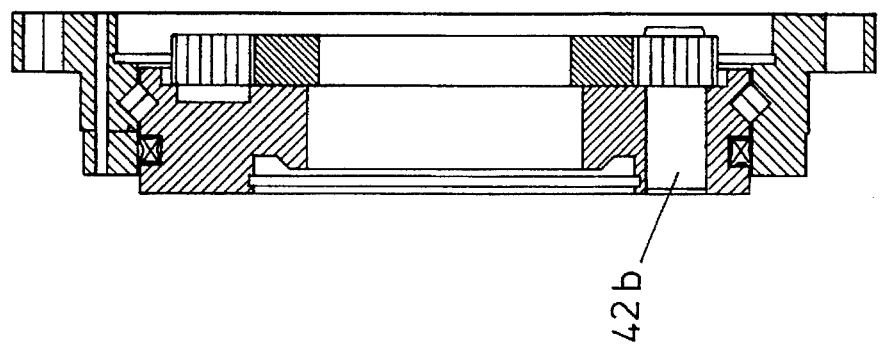
FIG. 8 is a sectional view of the output shaft and its journals, and shows the plate provided with blocks and rollers.
Figure 10:
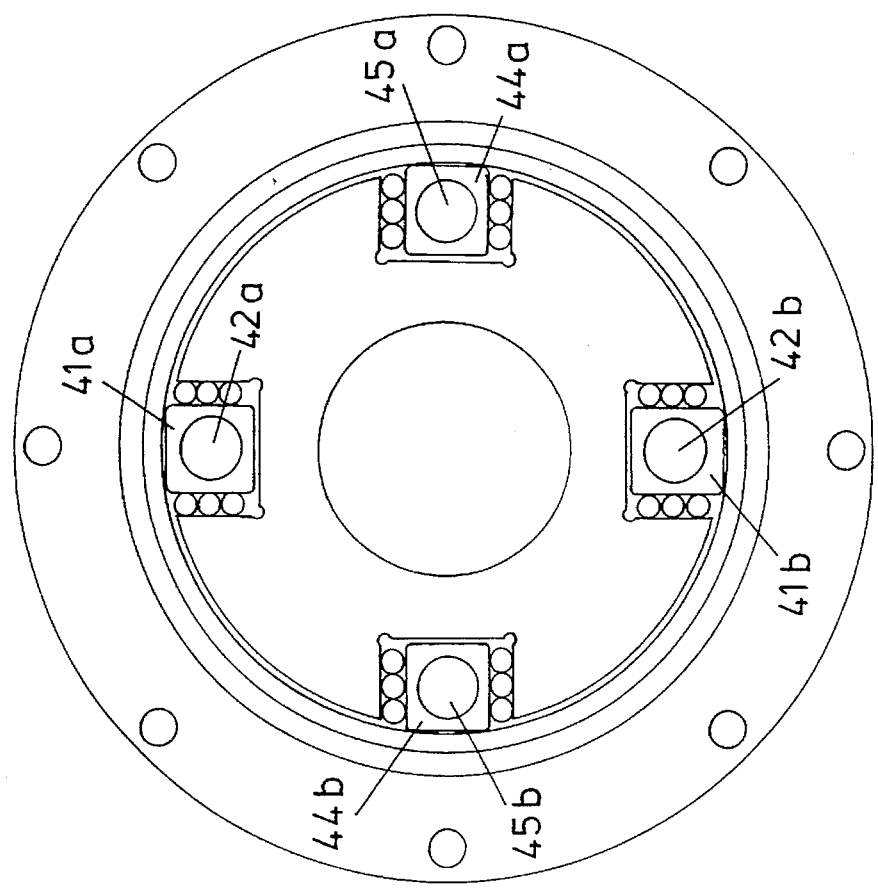
FIG. 10 is an axial view of FIG. 8.

FIG. 8 is a sectional view similar to FIG. 5, although in this case the integrated cams 36a, 37a have been replaced with studs 42a, 42b on which blocks 41a, 41b (FIG. 10) are journalled. Two similar blocks 44a, 44b are journalled in the two remaining apertures 38. The blocks include holes 45a, 45b into which the studs 43a, 43b (FIG. 9) are inserted when assembling the gear.

The advantage afforded by the embodiment described above and illustrated in FIGS. 8–10 is that the arrangement is self-adjusting in a manner to obtain a good distribution of the load between the rollers.

Figure 11:
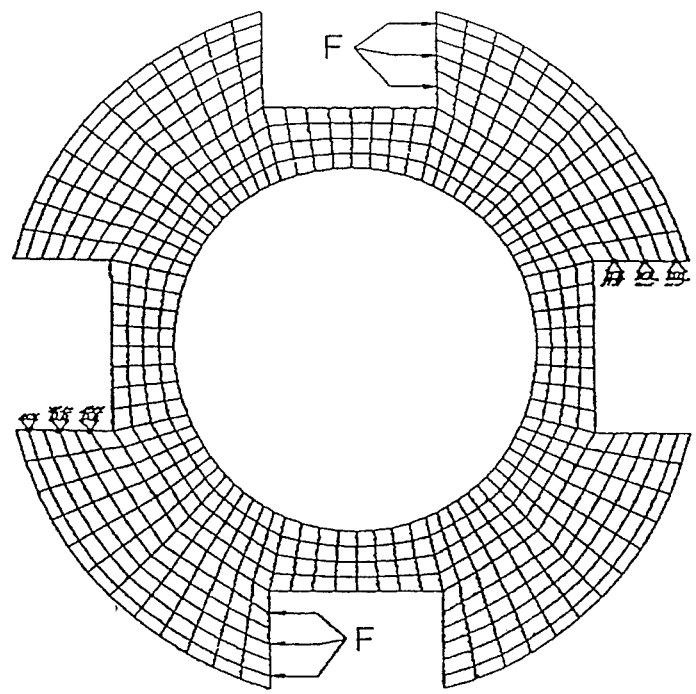
FIG. 11 illustrates an FEM plate-calculating model.

FIG. 11 illustrates an FEM-calculation model (Finite Element Measurement). The grid pattern is comprised of the finite elements. The aperture openings are subjected to a uniformly distributed load F.

Figure 12:
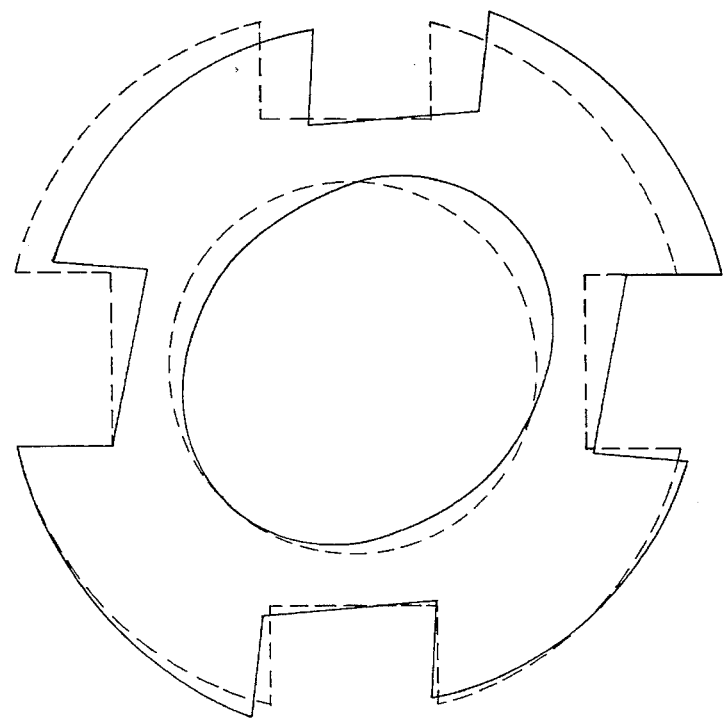
FIG. 12 illustrates the plate in an FEB-calculated deformed state (the deformation being greatly enlarged).

FIG. 12 illustrates the deformed plate. It will be seen that the centre hole of the plate is deformed to an elliptical shape and that an angular change has occurred between the initially parallel surfaces. For reasons of a calculation/technical nature, the deformation-figure is not symmetrical, although it will be symmetrical in reality. In order to calculate the outward bulging of the plate, the two diametrically opposed bulges are added together and divided by two.

The aforedescribed construction of the inventive coupling arrangement provides a highly rigid torque transfer. The plate 34 will execute a linear, reciprocating movement in relation to the output shaft 33. The frequency of this movement is equal to the rotational speed of the input shaft per second, i.e. the movement has a high frequency. The plate mass will thus result in a high-frequency, dynamic radially acting disturbance force which is coupled in the direction of the output shaft 33. The size of this force is a function of plate mass, frequency and amplitude.

A characteristic feature of this type of eccentric gear (see my earlier publication WO 88/05508) is that the eccentricity is small, normally in the region of 0.5–1.2 mm (among other things, depending on the transmission ratio). Low level angular vibrations are important with regard to servo-applications. The radially directed vibrations have no great significance, and no appreciable disturbances have been experienced in practice.

In order to minimize the mass of the plate 34, the plate is suitably manufactured by precision forging and then subsequently machined, for instance milled, hardened and ground.

As before indicated, in simpler gear applications, the rollers can either be replaced with balls or slide (plain) bearings can be used between the cams and the plate apertures. In order to provide slide bearings that have a satisfactory useful life, each slide surface will preferably be comprised of a suitable slide-bearing material, such as acetal plastic material or some other appropriate plastic material, or some type of journal bearing material. When torque transmissions are anticipated to be low, the plate may be constructed totally or partially from a plastic material, optionally with the provision of resilient tongues or like devices which will provide a play-free arrangement. The gearwheel and output shaft may also be made of an appropriate plastic material, with the cams forming an integral part.

I claim:

1. A coupling mechanism for translating low rotational speed of a gearwheel around its center from a high planetary rotational speed about a first axis to a centric rotation about a second axis comprising:

a gearwheel which is mounted upon a first shaft;

a second shaft;

a plate which includes a first pair of wall apertures, and a second pair of wall apertures, disposed generally equidistantly on the plate;

a first pair of axially extending studs mounted on said gearwheel;

a first and second block each of which is journalled to a respective stud of said first pair of axially extending studs and is displaceable radially relative to said plate in a respective wall aperture of said first pair of wall apertures;

a second pair of axially extending studs mounted on said second shaft;

a third and fourth block each of which is journalled to a respective stud of said second pair of axially extending studs and is displaceable radially relative to said plate in a respective wall aperture of said second pair of wall apertures; and a plurality of sets of cylindrically shaped rolling bodies, each set of cylindrically shaped rolling bodies of said plurality extending in a linear row and being positioned between a side surface of a respective block and a side surface of a corresponding wall aperture in which said respective block is displaceable radially relative to said plate; said cylindrically shaped rolling bodies having a diameter and a mutual diameter difference such as to obtain a high bias and a generally uniformly distributed load when the plate is subjected to a given torque-load deformation.

\* \* \* \* \*